April 15, 1941.  A. M. WOLF  2,238,616

MOTOR VEHICLE DRIVING MECHANISM

Original Filed April 9, 1936

INVENTOR.
Austin M. Wolf,
BY
M. C. Fyddane
ATTORNEY.

Patented Apr. 15, 1941

2,238,616

UNITED STATES PATENT OFFICE 2,238,616

MOTOR VEHICLE DRIVING MECHANISM

Austin M. Wolf, Plainfield, N. J.

Original application April 9, 1936, Serial No. 73,584, which is a continuation of application Serial No. 612,057, May 18, 1932. Divided and this application August 1, 1939, Serial No. 287,705

6 Claims. (Cl. 180—54)

This invention relates to motor vehicle driving mechanism, the subject matter of the present application constituting a division of my pending application for Patent Ser. No. 73,584 filed April 9, 1936, now Patent 2,185,165, which in turn is a continuation of my original application Ser. No. 612,057 filed May 18, 1932.

My invention, though not necessarily limited thereto, is particularly designed for use in connection with large motor driven buses, trucks, and other vehicles requiring a large power plant of great power output. However long such vehicles may be, their width is necessarily limited and cannot exceed a given maximum. It is therefore the object of the present invention to provide an improved mounting and arrangement of the power plant including the power transfer gearing, transmission and the propelling means connecting the same with the differential of the vehicle drive axle whereby the power will be efficiently transmitted to the latter with minimum loss, and the useful space within the body of the motor vehicle increased to a maximum.

In one embodiment of the invention, the power plant includes an engine with a transfer gear box and clutch at one end thereof mounted transversely in one end of the vehicle frame and occupying the major portion of the width of the vehicle, together with transmission mechanism operatively connected with the gear box, and a propelling shaft disposed diagonally with respect to the engine power shaft and operatively connecting the transmission with the differential drive mechanism.

In another embodiment of the invention I propose to position the transmission also in diagonal relation to the engine power shaft and to connect the same with the differential and the power transfer gear box by diagonally aligned propeller shafts.

Another feature of the invention, in one of its embodiments, resides in the provision of accessory drive means beyond the transfer gear box operatively connected with a driven element of the latter.

In certain installations where space conditions permit I propose the use of a power plant embodying a pair of diagonally related engines with a common power transfer gear box rigidly connecting adjacent ends thereof.

With the above and other objects in view, the invention consists in the improved motor vehicle driving mechanism and in the construction and relative arrangement of the several component parts thereof, as will be hereinafter more fully described, illustrated in the accompanying drawing and subsequently incorporated in the subjoined claims.

In the drawing wherein I have disclosed several simple and practical embodiments of the present invention and in which similar reference characters designate corresponding parts throughout the several views.

Figure 1:
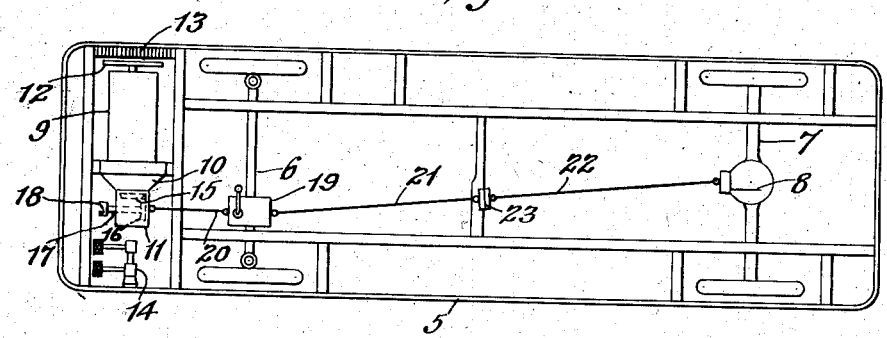
Fig. 1 is a plan view of a motor vehicle frame or chassis showing one embodiment of the invention applied thereto.

Referring in particular to Fig. 1 of the drawing, for purposes of illustration I have shown the frame or chassis 5 of a motor bus or truck which is mounted by means of any conventional suspension system upon the front and rear supporting axles 6 and 7 respectively, the latter being centrally provided with the usual differential mechanism indicated at 8.

As disclosed in my parent application above identified, the power plant may be located at either the front or rear end of the vehicle. In the present instance, I have shown a front end mounting of the power plant which includes the engine 9 suitably mounted in the vehicle frame forwardly of the front axle 6 and in transverse parallel relation with said axle. The center of gravity of the engine is located on one side of the longitudinal center line of the vehicle and at the other side of said center line, the unitary clutch housing 10 and transfer gear box 11 is rigidly fixed to the end of the engine cylinder block. At the other end of the engine the usual fan 12 is provided at the inner side of the radiator 13, suitably mounted on one side of the vehicle frame. At the opposite side of said frame the bracket 14 supports the brake and clutch control pedals.

The box 11 houses the clutch driven beveled gear 15 which is in constant mesh with a similar gear 16 on shaft 17 mounted in said gear box at right angles to the axis of the clutch driven gear 15. The shaft 17 may be extended forwardly from the gear box 11 and provided with a starting-crank jaw 18.

The change speed transmission 19, as herein shown, is rearwardly spaced from the gear box 11 and approximately above the front wheel axle 6 and is connected with the driven power transfer gear 16 by the short length universally jointed shaft 20. It will be noted that the transmission 19 and transfer gear box 11 are located on the opposite side of the longitudinal center line of the vehicle with respect to the center of gravity of the engine 9.

The transmission 19 is operatively connected with the differential drive mechanism 8 by the aligned diagonally extending shafts 21 and 22 operatively connected with each other at the bearing box 23 centrally mounted in the vehicle frame.

By means of the above described arrangement of the several components or units, it will be seen that I obtain a more or less balanced weight distribution transversely of the vehicle frame and provide for the necessary flexibility in the propelling connections during relative movement between the sprung and unsprung parts of the vehicle. Also such arrangement provides for the efficient transmission of power to the differential drive mechanism with a minimum of loss. Of course when the power plant is mounted at the rear end of the vehicle, there will be a much closer relation between the gear box 11, transmission 19 and the differential 8 so that in place of the diagonal shafts 21 and 22, a single relatively short diagonal propelling shaft would connect the transmission with the differential.

Figure 2:
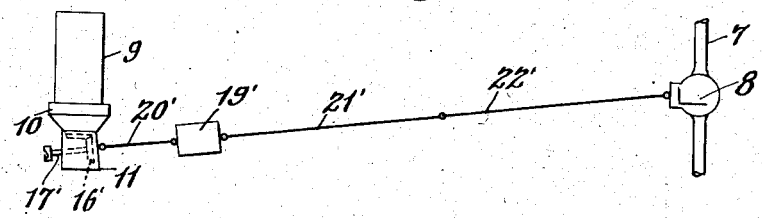
Fig 2 is a plan view illustrating a slightly modified arrangement of the several units.

In Fig. 2 of the drawing, I have shown a slightly modified arrangement of the several units, in which the power output shaft 17' carrying the clutch driven gear 16' is mounted in gear box 11 with its axis diagonally disposed relative to the power shaft axis of the engine. Also in this case, the transmission 19' is diagonally positioned relative to the engine power shaft. Therefore the power transmission shaft 20' between the transfer gear box and the transmission and propeller shafts 21' and 22' connecting the transmission with the differential drive mechanism are all arranged in alignment with each other and with the transmission 19' in diagonally extending relation to the power shaft axis.

Figure 3:
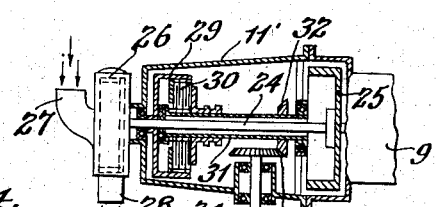
Fig. 3 is a longitudinal sectional view through the power transfer gear box, illustrating the mounting and arrangement of accessory driving means in combination therewith, and, Figs. 4, 5 and 6 illustrate various arrangements of the engines of dual power plants and the power transfer means therefor.

In Fig. 3 of the drawing I illustrate an alternative form of power transfer means mounted on the end of the engine cylinder block as in Fig. 1, and having accessory driving means combined therewith. In this case power input shaft 24 is coupled to one end of the engine crank shaft having flywheel 25 and extends centrally through the gear box 11' and beyond the end thereof, for the purpose of driving any one or more of the accessory units. In the present instance, I have shown the extended end of the power input shaft connected to drive a fan blower having a casing 26 suitably secured to the end of the gear box 11' and provided with the air inlet 27 and outlet 28.

Within the adjacent end of the box 11' the driving clutch element 29 is fixed to the power input shaft 24 with which driven clutch elements or disks 30 at one end of the tubular shaft 31 coact. This tubular shaft is disposed in spaced concentric relation with the shaft 24 and at its other end carries the beveled gear 32 in constant mesh with a similar gear 33 on the inner end of the power transmission shaft 34 mounted in one side of the gear box 11', and through which the power output of the engine is transmitted from the clutch to the change speed transmission 19.

The invention last described is not claimed herein but forms the subject matter of a divisional application for patent Serial No. 359,651 filed October 4, 1940.

The above described arrangements of the variable speed transmission and propelling connections with the engine clutch and differential mechanism may also be employed in connection with dual engine power plants such as those illustrated and described in my above identified parent application.

Figure 4:
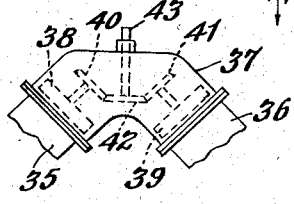
Figure 5:
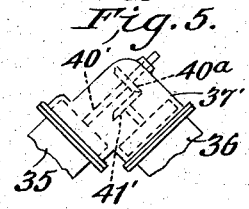
Figure 6:
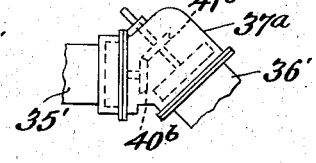

In Figs. 4, 5 and 6 of the drawing I have illustrated several of such dual engine arrangements and power transfer means from which the combined power output of the two engines may be transmitted to the variable speed transmission mechanism.

In Fig. 4 the engines 35 and 36 are mounted and arranged in the vehicle frame in a common horizontal plane and with their crank shaft axes disposed at an angle of approximately 90° relative to each other. The adjacent ends of the engine cylinder blocks are rigidly connected by the transfer gear box or housing 37. Preferably, in order that the vehicle may be operated with one engine, should the other become disabled or when carrying light loads, I provide independently operable clutches 38 and 39 respectively for transferring the power through gears 40 and 41 to a common gear 42 fixed to the inner end of shaft 43 centrally mounted in the gear box 37, which is adapted to be connected with the change speed transmission as above explained.

In Fig. 5 of the drawing the two engines are arranged in the same angular relationship but in this case the clutch driven shaft 40' of one engine carrying the gear 40a extends entirely through the gear box 37' and is adapted for connection with the change speed transmission, while the clutch driven shaft of the other engine terminates within the gear box with the gear 41' in mesh with gear 40a, as in Fig. 4.

In Fig. 6 of the drawing, one engine 35' is mounted in the vehicle frame at a 90° angle with respect to the center line thereof while the other engine 36' is positioned at a 45° angle. A relatively short gear box 37a rigidly connects the adjacent ends of the engine cylinder block, and as in Fig. 5 the clutch driven shafts of the respective engines are directly connected by the beveled gears 40b and 41b, the latter gear shaft extending through the gear box 37a for connection with the variable speed transmission.

While I have described and illustrated in the accompanying drawing several concrete examples of practical embodiments of my present invention, it is nevertheless to be understood that in each of the disclosed constructions, the combination, construction and relative arrangement of the various units and elements are susceptible of more or less modification. Accordingly, this invention is not to be limited in these particulars since it may also be exemplified in various other alternative forms not herein specifically disclosed, but which may be fairly comprehended as within the spirit and scope of the appended claims.

I claim:

1. In a motor vehicle, a supporting structure, an engine mounted on said structure with its power shaft disposed at an angle relative to the center line of the vehicle, a power output shaft having driving connection with one end of said power shaft and angularly related to the axis thereof at one side of the vehicle center line, a differential drive mechanism located on the vehicle center line, and power transmitting connections between said power output shaft and differential, including a change speed transmission in alignment with the power output shaft and a propeller shaft connecting said transmission with the differential and extending diagonally of the supporting structure with respect to said engine power shaft.

2. In a motor vehicle, a supporting structure, a transversely disposed engine and clutch unit mounted on said structure, a differential drive mechanism and housing therefor located on the vehicle center line, variable speed mechanism and a housing therefor disposed out of longitudinal alignment with said differential mechanism, power transmission means between the variable speed mechanism and differential, and a universally jointed drive shaft extending diagonally of the engine in line with the variable speed housing and coupling said clutch and variable speed mechanism.

3. In a motor vehicle, a supporting structure, a transversely disposed engine and clutch unit mounted on said structure, a differential drive mechanism and housing therefor, variable speed mechanism and a housing therefor disposed out of longitudinal alignment with said differential mechanism, power transmission means between the variable speed mechanism and the engine clutch, and a universally jointed propeller shaft extending diagonally of the engine and connecting said variable speed transmission with the differential.

4. In a motor vehicle, a supporting structure, a transversely disposed engine and clutch unit mounted on said structure, a differential drive mechanism and power transmitting connections between the engine clutch and said differential mechanism, including an intermediate variable speed mechanism and propelling shafts connecting said mechanism with the engine clutch and the differential, said variable speed mechanism and shafts being disposed in longitudinal alignment and extending diagonally of the supporting structure with respect to said engine.

5. In a motor vehicle end construction, a transversely disposed power plant occupying the major part of the width of the vehicle with its center of gravity disposed at one side of the vehicle center line, said power plant including an engine and power transfer means clutch-connected with one end of the engine crank shaft and having a gear box, power transmitting means including a centrally disposed differential, change speed mechanism, a diagonally disposed drive shaft connecting said change speed mechanism and the clutch through said power transfer means, and accessory drive means beyond the gear box operatively connected with a driven element of said power transfer means.

6. In a motor vehicle end construction, a transversely disposed power plant occupying the major part of the width of the vehicle with its center of gravity on one side of the vehicle center line, said power plant including an engine on one side of the vehicle center line, a gear box on the other side of the vehicle center line, power transfer means in said box and a clutch drive connecting the same with one end of the engine crank shaft, power transmitting means including a centrally disposed differential and change speed mechanism, a diagonally disposed propeller shaft connecting the change speed mechanism with the differential, means drive connecting the change speed mechanism and the clutch through said power transfer means, and accessory drive means in axial alignment with the engine crank shaft beyond the gear box and operatively connected with a driven element of said power transfer means.

AUSTIN M. WOLF.